United States Patent
Trnka et al.

(10) Patent No.: US 9,964,929 B2
(45) Date of Patent: May 8, 2018

(54) ANTI-WINDUP REFERENCE SHAPING FILTER FOR CONTROL

(71) Applicant: Honeywell International Inc., Morristown, NJ (US)

(72) Inventors: Pavel Trnka, Prague (CZ); Jiri Dostal, Pardubicky kraj (CZ)

(73) Assignee: Honeywell International Inc., Morris Plains, NJ (US)

( * ) Notice: Subject to any disclaimer, the term of this patent is extended or adjusted under 35 U.S.C. 154(b) by 349 days.

(21) Appl. No.: 14/713,460

(22) Filed: May 15, 2015

(65) Prior Publication Data
US 2016/0334761 A1    Nov. 17, 2016

(51) Int. Cl.
*G05B 11/42*    (2006.01)
*G05B 5/01*    (2006.01)

(52) U.S. Cl.
CPC ............ *G05B 11/42* (2013.01); *G05B 5/01* (2013.01)

(58) Field of Classification Search
CPC ................................ G05B 11/42; G05B 5/01
See application file for complete search history.

(56) References Cited

U.S. PATENT DOCUMENTS

| | | |
|---|---|---|
| 3,523,193 A | 8/1970 | Hutcheon |
| 2002/0111758 A1* | 8/2002 | Wang .................. G05B 13/042 702/79 |
| 2014/0217998 A1* | 8/2014 | Krueger .................. G05F 1/46 323/273 |
| 2015/0057768 A1* | 2/2015 | Tanaka ................ G05B 13/021 700/34 |
| 2016/0282829 A1* | 9/2016 | Motohashi ............ G05B 11/42 |

FOREIGN PATENT DOCUMENTS

| | | |
|---|---|---|
| EP | 3073205 A1 | 9/2016 |
| GB | 2322946 A | 9/1998 |
| WO | WO-95/33229 A1 | 12/1995 |

OTHER PUBLICATIONS

"European Application Serial No. 16168196.0, Extended European Search Report dated Oct. 27, 2016", 6 pgs.

* cited by examiner

*Primary Examiner* — Thomas Lee
*Assistant Examiner* — Vincent Chang
(74) *Attorney, Agent, or Firm* — Schwegman, Lundberg & Woessner, P.A.

(57) ABSTRACT

A device includes an upper limit input to provide an upper limit value, a lower limit input to provide an upper limit value, a control signal input to receive a control signal from a controller, an output, and circuitry coupled to the upper limit input, the lower limit input, and the control signal input to provide an output signal on the output that is constrained by the upper limit value and the lower limit value and that follows the control signal derivative if possible.

17 Claims, 6 Drawing Sheets

ANTI-WINDUP REFERENCE SHAPING FILTER FOR CONTROL

BACKGROUND

An anti-windup system is an essential part of a process controller with integrating control action (mainly PI and PID controller) that significantly improves control quality (e.g. reference tracking quality). The process controller output either directly manipulates an actuator or provides a reference for a subsequent cascade controller. In both cases those systems have a certain input range that must to be respected. It is well known that a simple clamping of the controller output to this range without anti-windup system can lead to delayed controller reaction and poor control quality. This is caused by an unconstrained value of the integrator that can push the controller output far from the range. The functionality of the anti-windup system is to adjust the integrator value such that the controller output is within the range and such that it promptly reacts to disturbances and reference changes.

A standard anti-windup system has two main requirements. It must be able to adjust the controller integrator value and it must know an input range of a system connected to the controller output. Due to the first requirement and due to practical consideration, an anti-windup system is usually an integral part of a controller. However, there are cases, where it is not possible to simultaneously meet both requirements. This can happen when the communication between the controller and the system connected to its output is limited such that the controller does not know the correct range and the connected system cannot influence the controller integrator value by any means.

An example can be a widespread combination of a room temperature controller with a fan coil unit controller in buildings. The power of the fan coil unit changes with a fluctuating supply water temperature, but typically there is no way how to communicate this time variable limit to the room temperature controller. Either it does not accept such information or there is no communication channel for this. Another example can be controller retrofitting.

SUMMARY

A device includes an upper limit input to provide an upper limit value, a lower limit input to provide an upper limit value, a control signal input to receive a control signal from a controller, an output, and circuitry coupled to the upper limit input, the lower limit input, and the control signal input to provide an output signal on the output that is constrained by the upper limit value and the lower limit value while following the control signal derivative if possible.

A method includes receiving an input signal from a separate controller, receiving an upper limit and a lower limit, and providing an output signal to track the input signal constrained between the upper limit value and the lower limit value without influencing the performance of the controller.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media or computer readable storage device such as one or more memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
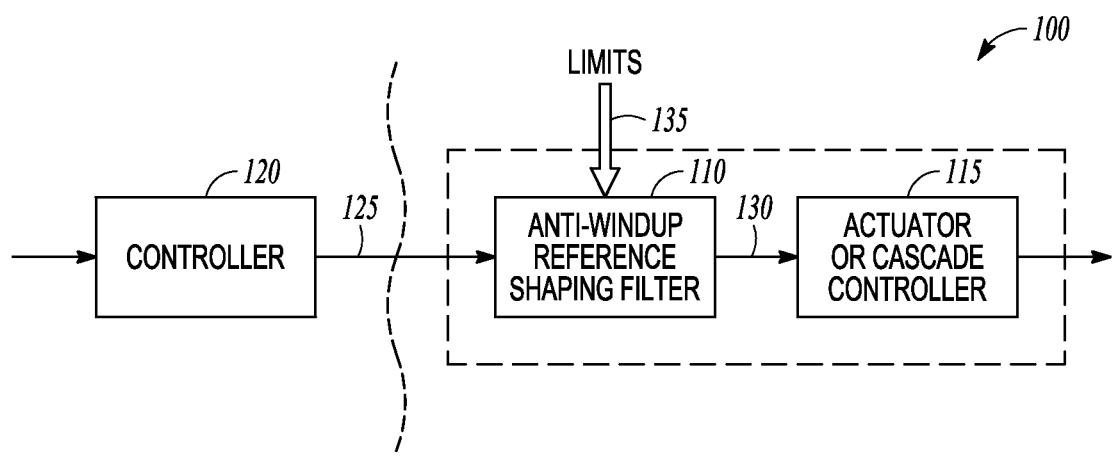
FIG. 1 is a block diagram of an anti-windup reference shaping filter according to an example embodiment.

FIG. 1 is a block diagram of a control loop 100 that includes an anti-windup reference shaping filter 110 coupled to a system 115 that is being controlled via a controller 120. In one embodiment, the reference shaping filter 110 receives output from the controller 120 via a connection 125, which may be wired or wireless in various embodiments using any suitable communication protocol. Connection 125 may also be referred to as the input signal 125 of reference shaping filter 110. The reference shaping filter 110 serves as an anti-windup system connected via a connection 130 to an input of system 115 which may be an actuator or a cascade controller. Connection 130 may also be referred to as the output signal 130 of reference shaping filter 110.

System 115 range information may be provided to the reference shaping filter 110 in the form of limits as indicated by connection 135. The limits may be provided by a technician putting together a control loop that contains a system 115, such as an actuator or cascade controller, or the limits may be provided by a cascade controller, or in the case of an intelligent actuator, the limits may be provided by the actuator itself. Since limits of a cascade controller or an actuator may vary with different conditions, such as environmental conditions, the provision of the limits by the intelligent controller allow for time-variable range control. In other words, the range limits provided to the reference shaping filter may be modified in real time responsive to environmental conditions such as a temperature of cooling water for example. The reference shaping filter 110 offsets the input signal 125 received from controller 120 such that an output signal 130 via connection 130 provided to the system 115 is always in the range suitable for system 115.

The output signal 130 derivative (rate of change) is equal to the input signal 125 derivative (rate of change) whenever the output signal 130 is within the range or whenever the output signal 130 is on the range limit and the input signal 125 derivative would make it move inside the limits. The output signal 130 is abruptly clamped whenever needed to respect time-variable range.

The functionality can be described by rules for the filter output 130 value and derivative as follows:

if $y(t) < LB(t)$ then $LB(t) \rightarrow y(t)$ if $y(t) > UB(t)$ then $UB(t) \rightarrow y(t)$ if $(LB(t) == y(t)$ and $\dot{u}(t) < 0)$ or $(UB(t) == y(t)$ and $\dot{u}(t) > 0)$ then $0 \rightarrow \dot{y}(t)$ else $\dot{u}(t) \rightarrow \dot{y}(t)$ where u is filter input, $\dot{u}$ is a derivative of filter input, y is filter output, $\dot{y}$ is a derivative of filter output, LB is lower range limit and UB is upper range limit.

Figure 2:
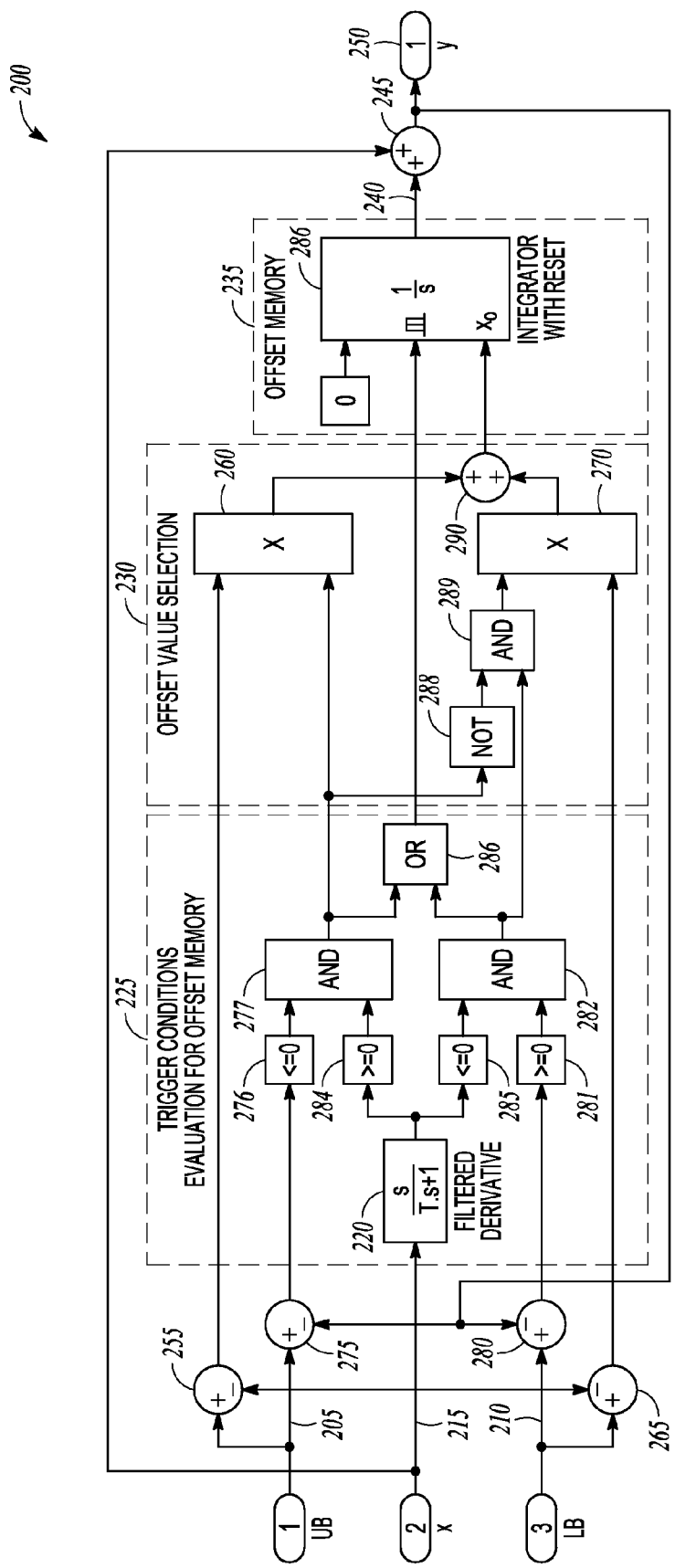
FIG. 2 is a block schematic diagram of a continuous anti-windup reference shaping filter device according to an example embodiment.

This can be practically realized in one embodiment via a block schematic diagram of an anti-windup reference shaping filter 200 in FIG. 2. An upper limit 205, lower limit 210, and input 215 to the filter 200 are provided to several functional groups of blocks. The input 215, shown as "X", is provided to a filtered derivative block 220, which is part of a functional group of blocks 225 and serves to evaluate trigger conditions for an offset memory. A next group of blocks 230 corresponds to providing an offset value selection, and a final group of blocks 235 corresponds to the offset memory used to keep the input to the actuator or cascade controller in an acceptable range. An offset memory output 240 from blocks 235 is added with input 215 via a summing node 245 to provide an output 250 for provision to a system being controlled. In one embodiment, the offset memory can be realized by any memory which stores its input signal value if the trigger signal is non-zero. To do this in a very specific case of a Matlab/Simulink environment an integrator with a reset signal may be used.

Trigger conditions evaluation blocks 225 include several summing blocks that receive the input 215 and limits 205 and 210, as well as the output 245, and provide sums to groups of blocks 225 and 230. The first summing block 255 subtracts the input 215 from the upper limit 205 and provides the sum to a multiplication block 260 in the group of blocks 230. A second summing block 265 subtracts the input 215 from the lower limit 210 and provides the sum to a multiplication block 270 in the group of blocks 230. A third summing block 275 subtracts the output 250 from the upper limit 205 and provides the sum to a block 276 that provides a logical representation of a comparison of the sum to less than or equal to zero to an AND gate 277. A fourth summing block 280 subtracts the output 250 from the lower limit 210 and provides the sum to a block 281 that provides a logical representation of a comparison of the sum to greater than or equal to zero to an AND gate 282.

The filtered derivative from block 220 is provided to a block 284 that provides a logical representation of being greater than or equal to zero, which is then provided to AND gate 277. The filtered derivative from block 220 is provided to a block 285 that provides a logical representation of being less than or equal to zero, which is then provided to AND gate 281.

Results from AND blocks 277 and 282 are provided to an OR block 285, whose result is forwarded to a level sensitive external reset input of an integrator 286 in the offset memory blocks 236. The result from AND block 277 is also provided to the offset value selection blocks 230 at multiplication block 260 and a NOT block 288. A result from NOT block 288 is ANDed with results from AND block 282 at an AND block 289. This result is provided to multiplication block 270. The results from multiplication blocks 260 and 270 are summed at a node 290, which is provided as an initial condition input to integrator 286. Integrator 286 operates as a triggered memory to provide an offset to node 245 to keep the output 250 within the range of proper inputs for the actuator or cascade controller.

Figure 3:
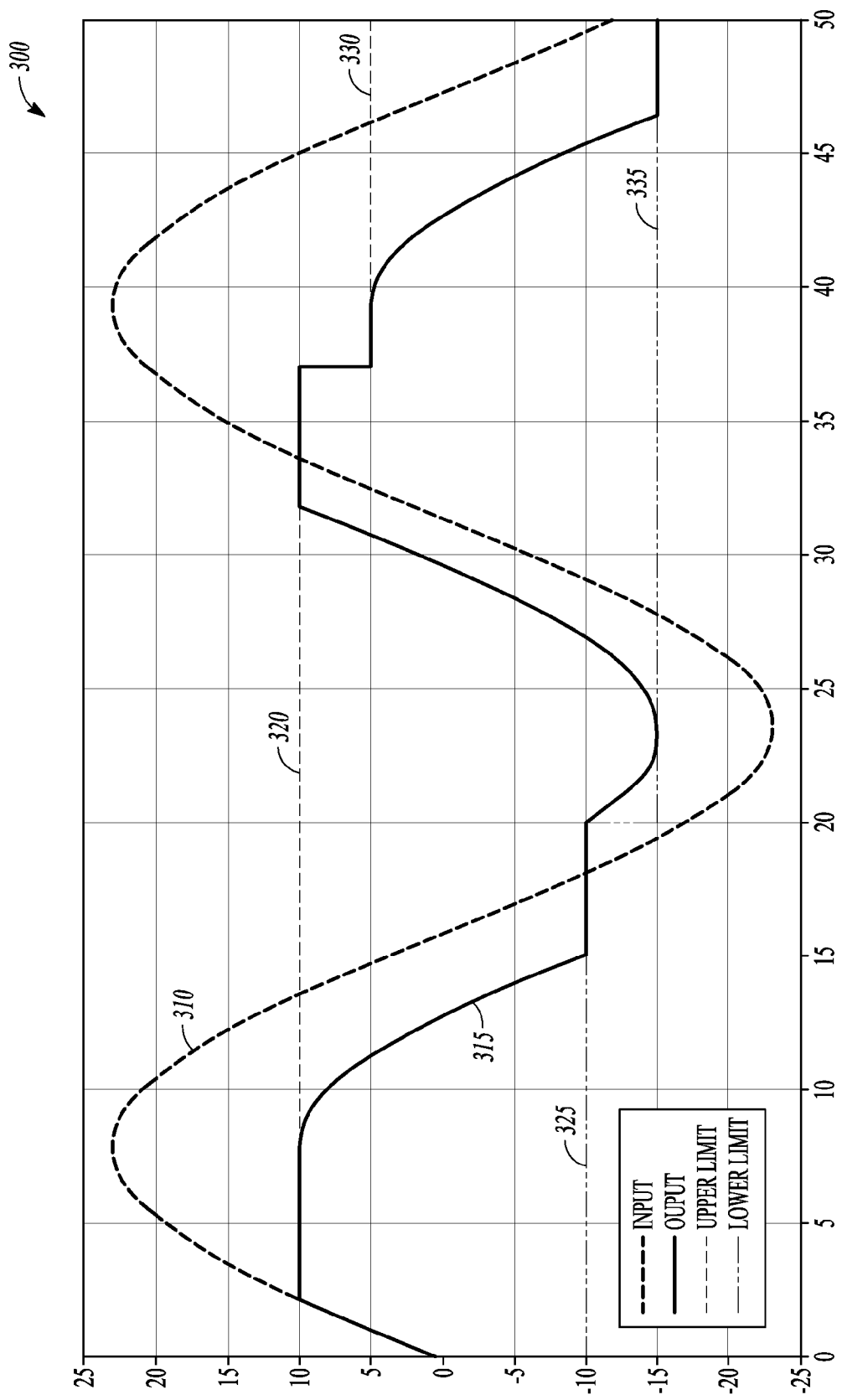
FIG. 3 is a graph illustrating example performance of the continuous anti-windup reference shaping filter device of FIG. 2 according to an example embodiment.

FIG. 3 is a graph 300 illustrating reference shaping filter functionality with lines used to represent the magnitude of signals and limits versus time for the reference shaping filter 200. The actual values of magnitude and time may vary with different implementations of the reference shaping filter 200. An input signal 310 is a harmonic signal in this example, with an output 315 of the reference shaping filter shown with respect to an upper limit 320 and a lower limit 325. The input signal 310 exceeds both limits as it oscillates above and below the limits. However, the output signal is shown as being constrained within the limits. Note that graph 300 also illustrates the time-variable nature of the limits and how the output 315 is constrained by changing limits. The upper limit changes at 37 time units, such as seconds, to a changed limit 330. The lower limit changes at 20 time units. In both cases, the output tracks the changes and stays within the limits. Note that the output abruptly changes if it violates a contracting limit (as occurs at a time instance of 37 time units); however, if the output is limited and the limit expands then the output does not change abruptly but starts to follow input signal derivative (as in time instance of 20 time units).

Figure 4:
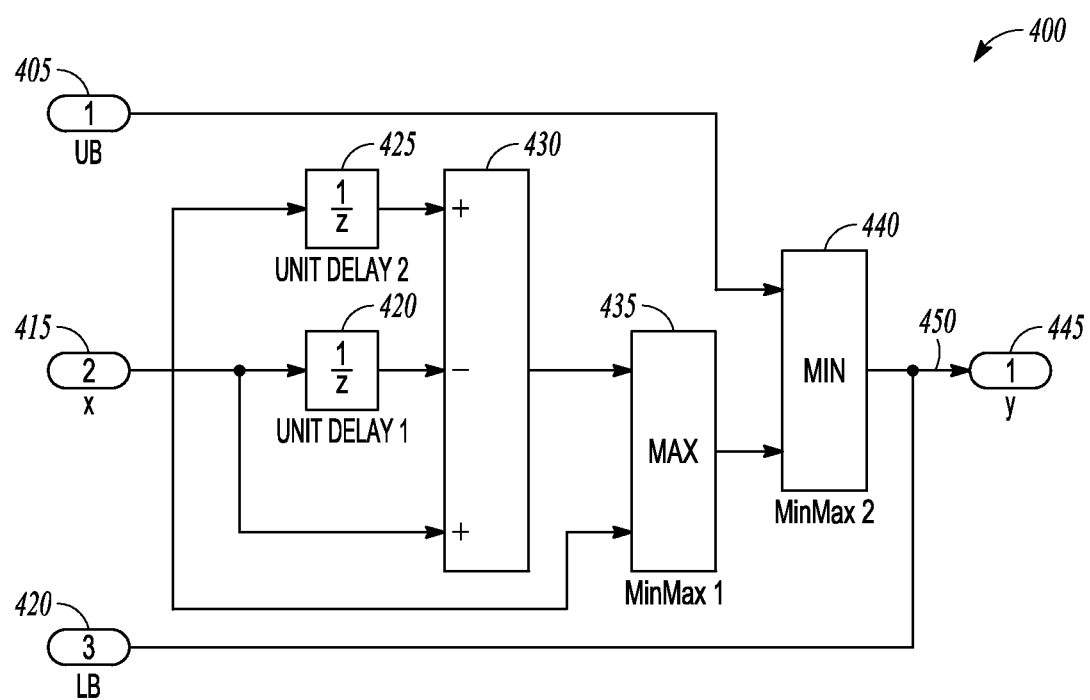
FIG. 4 is a block schematic diagram of a discrete anti-windup reference shaping filter device according to an example embodiment.

In a further embodiment, a discrete realization of the reference shaping filter is illustrated in block form in FIG. 4 at 400. An upper limit 405, lower limit 410, and input 415 are provided to the filter 400. The filter 400 includes a first unit delay 420 and a second unit delay 425 coupled to a summing block 430. Also included are a max bock 435 and a min block 440 that provides an output 445 on a line 450. Line 450 is coupled to second unit delay 425, which provides a delayed output to summing block 430. The first unit delay 420 receives the input 415 and provides a delayed input to summing block 430. The input 415 is also provided directly to summing block 430. Summing block 430 adds the second unit delay 425 output with the input 415 and subtracts the first unit delay 420 output to provide a summing block 430 output to max block 435, which also receives the lower limit 410. Max block 435 provides an input corresponding to the maximum of its inputs to min block 440, which also receives the upper limit 405. Min block 440 then provides the minimum between its inputs as the output 445 on line 450.

Figure 5:
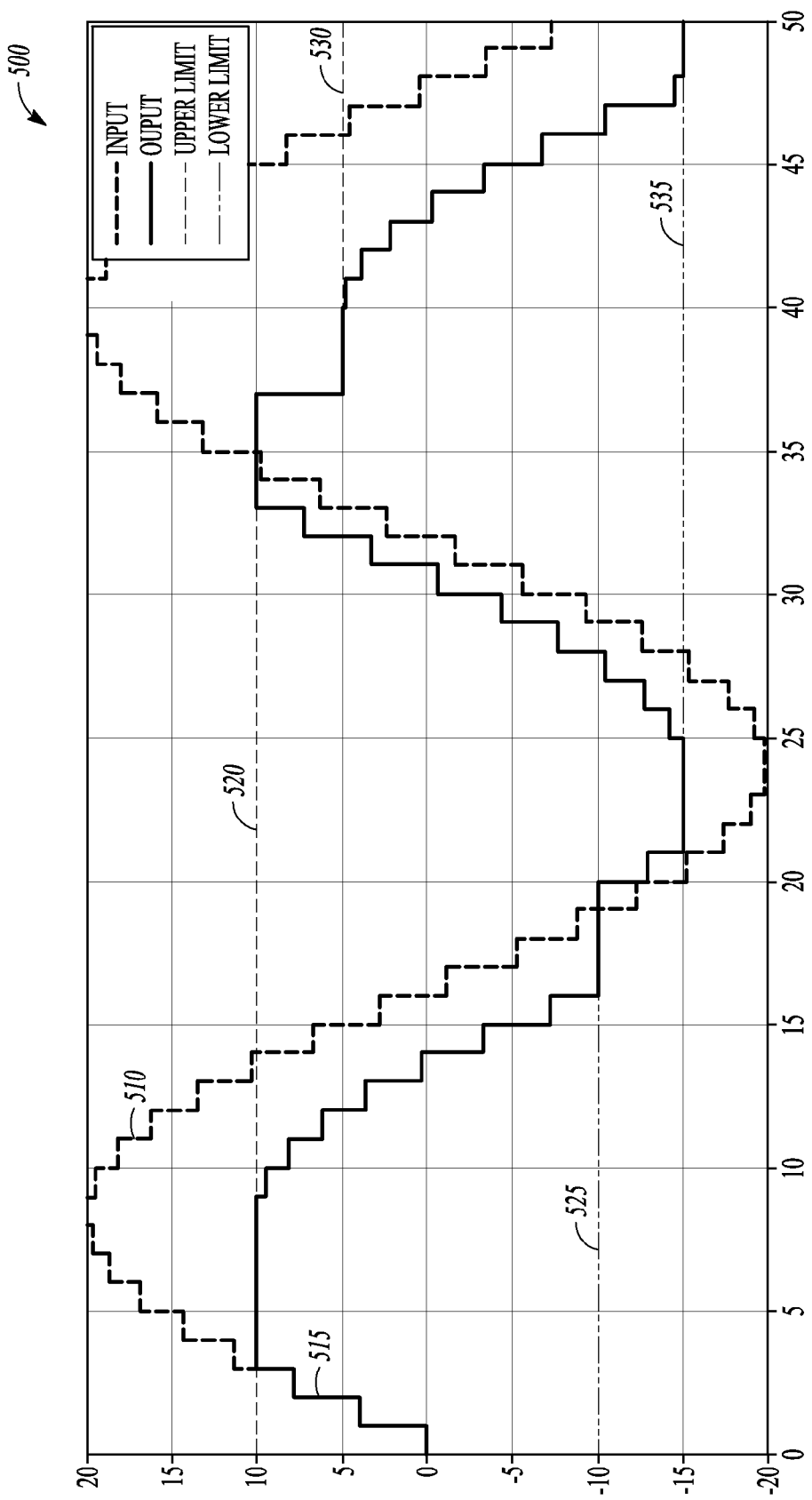
FIG. 5 is a graph illustrating example performance of the anti-windup reference shaping filter device of FIG. 4 according to an example embodiment.

FIG. 5 is a graph 500 illustrating reference shaping filter functionality with lines used to represent the magnitude of signals and limits versus time for the discrete reference shaping filter 500. The actual values of magnitude and time may vary with different implementations of the reference shaping filter 500. An input signal 510 is a discrete harmonic signal in this example having discrete levels, with an output 515 of the reference shaping filter shown with respect to an upper limit 520 and a lower limit 525. The input signal 510 exceeds both limits as it oscillates above and below the limits. However, the output signal is shown as being constrained within the limits. Note that graph 500 also illustrates the time-variable nature of the limits and how the output 515 is constrained within changing limits. The upper limit changes at 37 time units, such as seconds, to a changed limit 530. The lower limit changes at 20 time units. In both cases, the output tracks the changes and stays within the limits. Note that the output abruptly changes if it violates a contracting limit (as occurs at a time instance of 37 time units); however, if the output is limited and the limit expands then the output does not change abruptly but starts to follow input signal derivative (as occurs at a time instance of 20 time units).

Of note in filters 200 and 400 is that there is no need for feedback to the controller that provides input signal 215. The controller need not have knowledge of the filter 200. This allows the retro fitting of new actuators and cascade controllers by adding the reference shaping filter between the controller and actuators/cascade controllers without regard to whether the controller has the ability to limit its output to a range of values that the actuators and cascade controllers can accept as input. In various embodiments, an anti-windup reference shaping filter can replace the functionality of an anti-windup system in a controller with no degradation of control loop performance.

Figure 6:
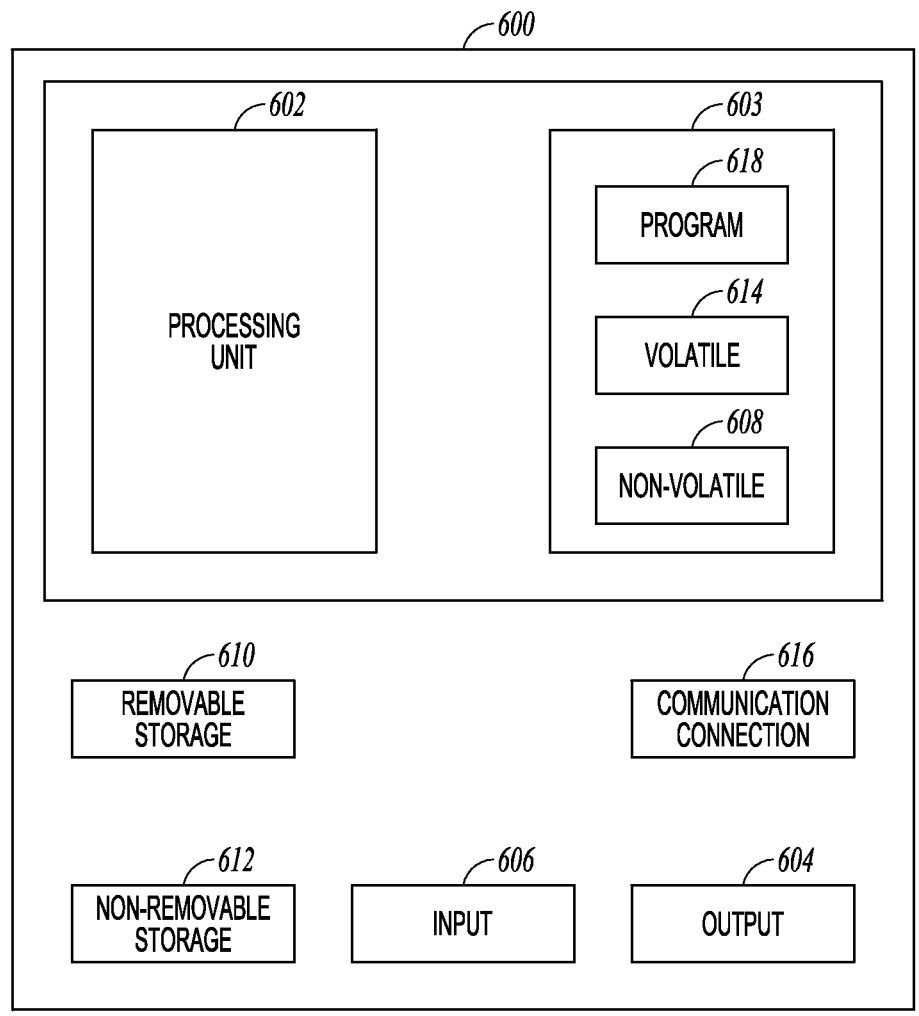
FIG. 6 is a block schematic diagram of circuitry for implementing a controller according to an example embodiment.

FIG. 6 is a block schematic diagram of a computer system 600 to implement controllers which may be used in conjunction with the filter described. All components need not be used in various embodiments, and in some embodiments, only components used for implementing control algorithms may be used, including hardware only embodiments and simple microprocessor embodiments implementing the control algorithms via software running on a processor.

One example computing device in the form of a computer 600, may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, or other computing device including the same or similar elements as illustrated and described with regard to FIG. 6. Devices such as smartphones, tablets, and smartwatches are generally collectively referred to as mobile devices. Further, although the various data storage elements are illustrated as part of the computer 600, the storage may also or alternatively include cloud-based storage accessible via a network, such as the Internet.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 602 of the computer 600. A hard drive, CD-ROM, and RAM are some examples of articles including a non-transitory computer-readable medium such as a storage device. The terms computer-readable medium and storage device do not include carrier waves. For example, a computer program 618 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 600 to provide generic access controls in a COM based computer network system having multiple users and servers.

EXAMPLES

1. A device comprising:
    an upper limit input to provide an upper limit value;
    a lower limit input to provide an upper limit value;
    a control signal input to receive a control signal from a controller;
    an output; and
    circuitry coupled to the upper limit input, the lower limit input, and the control signal input to provide an output signal on the output that is constrained by the upper limit value and the lower limit value and that follows the control signal derivative if possible.

2. The device of example 1 and further comprising a system coupled to the output to receive the output signal as an input signal.

3. The device of example 2 wherein the system comprises an actuator.

4. The device of example 2 wherein the system comprises a cascade controller.

5. The device of any of examples 1-4 wherein the device is configured to not provide a signal to the controller.

6. The device of any of examples 1-5 wherein the upper limit input and lower limit input are memory elements in the device storing the upper limit value and the lower limit value.

7. The device of any of examples 1-6 wherein the upper limit input and lower limit input provide time-variable upper limit and lower limit values.

8. The device of any of examples 1-7 wherein the circuitry comprises:
    a trigger condition evaluation set of circuits;
    an offset value selection set of circuits coupled to the trigger condition evaluation set of circuits; and
    an offset memory set of circuits coupled to the trigger condition valuation set of circuits and the offset value selection set of circuits.

9. The device of example 8 wherein the trigger condition evaluation set of circuits comprises a filtered derivative block to provide a derivative of the control signal.

10. The device of example 9 and wherein the trigger condition evaluation set of circuits includes summing junctions, comparison blocks and logic gates to provide an input to the offset memory set of circuits.

11. The device of example 10 wherein the offset memory set of circuits comprises a memory that stores the input signal value whenever the triggering signal has non-zero value.

12. The device of example 11 wherein the offset value selection set of circuits selects an offset to provide to the offset memory set of circuits.

13. The device of any of examples 1-12 wherein the circuitry implements rules for the output signal (y) in accordance with:

if $y(t)<LB(t)$ then $LB(t) \rightarrow y(t)$ if $y(t)>UB(t)$ then $UB(t) \rightarrow y(t)$ if $(LB(t)==y(t)$ and $\dot{u}(t)<0)$ or $(UB(t)==y(t)$ and $\dot{u}(t)>0)$ then $0 \rightarrow \dot{y}(t)$ else $\dot{u}(t) \rightarrow \dot{y}(t)$ where u is the input signal, $\dot{u}(t)$ is a derivative of the input signal, $\dot{y}$ is a derivative of the output signal, LB is a lower limit value and UB is the upper limit value.

14. The device of any of examples 1-13 wherein the circuitry comprises a discrete reference shaping filter.

15. The device of example 14 wherein the discrete reference shaping filter comprises:
first and second unit delay blocks for providing a delayed input and a delayed upper bound value;
a summing block to add the second unit delay block output with the input, and subtract the delayed input to provide a summing block output;
a max block coupled to receive the summing block output and the lower bound value to provide a maximum value; and
a min block coupled to receive the maximum value and the upper bound value and provide a minimum value as the output signal.

16. A method comprising:
receiving an input signal from a separate controller;
receiving an upper limit and a lower limit; and
providing an output signal to track the input signal constrained between the upper limit value and the lower limit value without influencing the performance of the controller.

17. The method of example 16 and further comprising providing the output to a system to be controlled.

18. The method of example 17 wherein the system to be controlled comprises an actuator or cascade controller that also provides time-variable upper and lower limits.

19. The method of any of examples 16-18 wherein the method is performed by a filter, wherein the upper limit and lower limit are received from memory elements in the filter.

20. The method of any of examples 16-19 wherein the upper limit and lower limit are time-variable.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A device comprising:
an upper limit input to provide an upper limit value;
a lower limit input to provide a lower limit value;
a control signal input to receive a control signal from a controller;
an output; and
circuitry coupled to the upper limit input, the lower limit input, and the control signal input to provide an output signal on the output that is constrained by the upper limit value and the lower limit value and that follows the control signal derivative unless the output signal is less than a lower input value or the output signal is greater than the upper limit value, the circuitry including:
first circuitry to determine a first difference between the upper limit value and the control signal input;
second circuitry to determine a second difference between the lower limit value and the control signal input;
third circuitry to determine a third difference between the lower limit value and a prior output signal;
fourth circuitry to determine a fourth difference between the upper limit value and the prior output signal; and
logic circuitry to determine whether the output signal is greater than the upper limit value and whether the output signal is less than the lower limit value based on the first, second, third, and fourth differences; and
wherein the output signal is provided to control a system.

2. The device of claim 1 and further comprising the system coupled to the output to receive the output signal as an input signal.

3. The device of claim 2 wherein the system comprises an actuator.

4. The device of claim 2 wherein the system comprises a cascade controller.

5. The device of claim 1 wherein the device is configured to not provide a signal to the controller.

6. The device of claim 1 wherein the upper limit input and lower limit input are memory elements in the device storing the upper limit value and the lower limit value.

7. The device of claim 1 wherein the upper limit input and lower limit input provide time-variable upper limit and lower limit values.

8. The device of claim 1 wherein the circuitry comprises:
a trigger condition evaluation set of circuits;
an offset value selection set of circuits coupled to the trigger condition evaluation set of circuits; and
an offset memory set of circuits coupled to the trigger condition valuation set of circuits and the offset value selection set of circuits.

9. The device of claim 8 wherein the trigger condition evaluation set of circuits comprises a filtered derivative block to provide a derivative of the control signal.

10. The device of claim 9 and wherein the trigger condition evaluation set of circuits includes summing junctions, comparison blocks and logic gates to provide an input to the offset memory set of circuits.

11. The device of claim 10 wherein the offset memory set of circuits comprises a memory that stores the input signal value whenever a triggering signal has non-zero value.

12. The device of claim 11 wherein the offset value selection set of circuits selects an offset to provide to the offset memory set of circuits.

13. The device of claim 1 wherein the circuitry implements rules for the output signal (y) in accordance with:

if $y(t)<LB(t)$ then $LB(t) \rightarrow y(t)$ if $y(t)>UB(t)$ then $UB(t) \rightarrow y(t)$ if $(LB(t)==y(t)$ and $u(t)<0)$ or $(UB(t)==y(t)$ and $u(t)>0)$ then $0 \rightarrow y(t)$ else $u(t) \rightarrow y(t)$ where u is the input signal, u(t) is a derivative of the input signal, y is a derivative of the output signal, LB is a lower limit value and UB is the upper limit value.

14. A method comprising:
receiving a control input signal from a separate controller;
receiving an upper limit value and a lower limit value;
determining, at first circuitry, a first difference between the upper limit value and the control signal input;
determining, at second circuitry, a second difference between the lower limit value and the control signal input;
determining, at third circuitry, a third difference between the lower limit value and a prior output signal;
determining, at fourth circuitry, a fourth difference between the upper limit value and the prior output signal;
determining, at logic circuitry, whether a first output signal is greater than the upper limit value and whether the output signal is less than the lower limit value based on the first, second, third, and fourth differences;
providing a second output signal that tracks the input signal constrained between the upper limit value and the lower limit value without influencing the performance of the controller, and based on the determination of whether the first output signal is greater than the upper limit value and whether the first output signal is less than the lower limit value; and
providing the second output signal to control a system.

15. The method of claim 14 wherein the system to be controlled comprises an actuator or cascade controller that also provides time-variable upper and low limits.

16. The method of claim 14 wherein the method is performed by a filter, wherein the upper limit and lower limit are received from memory elements in the filter.

17. The method of claim 14 wherein the upper limit and lower limit are time-variable.

* * * * *